(12) United States Patent
Verspoor et al.

(10) Patent No.: US 7,933,856 B2
(45) Date of Patent: Apr. 26, 2011

(54) SYSTEM AND METHOD FOR KNOWLEDGE BASED MATCHING OF USERS IN A NETWORK

(75) Inventors: Cornelia Maria Verspoor, Santa Fe, NM (US); Benjamin Hayden Sims, Los Alamos, NM (US); John Joseph Ambrosiano, Los Alamos, NM (US); Timothy James Cleland, Los Alamos, NM (US)

(73) Assignee: Los Alamos National Security LLC, Los Alamos, NM (US)

( * ) Notice: Subject to any disclaimer, the term of this patent is extended or adjusted under 35 U.S.C. 154(b) by 785 days.

(21) Appl. No.: 11/871,692

(22) Filed: Oct. 12, 2007

(65) Prior Publication Data

US 2009/0099998 A1   Apr. 16, 2009

(51) Int. Cl.
*G06F 17/00* (2006.01)
*G06N 7/00* (2006.01)
*G06N 7/08* (2006.01)

(52) U.S. Cl. ........................................................ 706/55

(58) Field of Classification Search .................... 706/55
See application file for complete search history.

(56) References Cited

U.S. PATENT DOCUMENTS

| 6,735,568 | B1 | 5/2004 | Buckwalter et al. |
| 7,177,880 | B2 | 2/2007 | Ruvolo et al. |
| 7,188,153 | B2 | 3/2007 | Lunt et al. |
| 7,191,139 | B2 * | 3/2007 | Roy et al. ................ 705/321 |
| 2006/0265270 | A1 * | 11/2006 | Hyder et al. ................ 705/9 |

* cited by examiner

*Primary Examiner* — Donald Sparks
*Assistant Examiner* — Peter Coughlan
(74) *Attorney, Agent, or Firm* — John P. O'Banion

(57) ABSTRACT

A knowledge-based system and methods to matchmaking and social network extension are disclosed. The system is configured to allow users to specify knowledge profiles, which are collections of concepts that indicate a certain topic or area of interest selected from an. The system utilizes the knowledge model as the semantic space within which to compare similarities in user interests. The knowledge model is hierarchical so that indications of interest in specific concepts automatically imply interest in more general concept. Similarity measures between profiles may then be calculated based on suitable distance formulas within this space.

10 Claims, 14 Drawing Sheets

Profile Table Viewer — 150

| Profile Name | Coverage: technology | Coverage: threat | Coverage: operations | Distance |
|---|---|---|---|---|
| 1287621 | 0.38 | 0.37 | 0.0 | |
| 812591 | 0.27 | 0.24 | 0.55 | |
| Ambrosiano | 0.33 | 0.37 | 0.0 | |
| Beason | 0.29 | 0.4 | 0.0 | |
| Cleland | 0.0 | 0.0 | 0.68 | |
| Sims | 0.0 | 0.52 | 0.0 | |
| Verspoor | 0.0 | 0.0 | 0.68 | |

152, 154, 156, 158, 160, 162, 164, 166, 168, 170, 172

174 — Group selected profiles
176 — View domain-based network
178 — Sort by distance to selected

FIG. 11

Profile Table Viewer

| Profile Name | Coverage: technology | Coverage: threat | Coverage: operations | Distance from John A. |
|---|---|---|---|---|
| Ambrosiano | 0.33 | 0.37 | 0.0 | 0.0 |
| Beason | 0.29 | 0.4 | 0.0 | 0.23 |
| Sims | 0.0 | 0.52 | 0.0 | 0.67 |
| 812591 | 0.27 | 0.24 | 0.55 | 0.86 |
| 1287621 | 0.38 | 0.37 | 0.0 | 0.89 |
| Cleland | 0.0 | 0.0 | 0.68 | 1.0 |
| Verspoor | 0.0 | 0.0 | 0.68 | 1.0 |

Group selected profiles | View domain-based network | Sort by distance to selected

FIG. 13

| | Profile Name | Coverage: technology | Coverage: threat | Coverage: operations | Distance from 8125... |
|---|---|---|---|---|---|
| | 1287621 | 0.27 | 0.24 | 0.55 | 0.0 |
| | 812591 | 0.38 | 0.37 | 0.0 | 0.29 |
| | Beason | 0.29 | 0.4 | 0.0 | 0.85 |
| | Ambrosiano | 0.33 | 0.37 | 0.0 | 0.86 |
| | Verspoor | 0.0 | 0.0 | 0.68 | 1.0 |
| | Cleland | 0.0 | 0.0 | 0.68 | 1.0 |
| | Sims | 0.0 | 0.52 | 0.0 | 1.0 |

Group selected profiles  View domain-based network  Sort by distance to selected

FIG. 16

| Profile Name | Coverage: technology | Coverage: threat | Coverage: operations | Distance from 8125... |
|---|---|---|---|---|
| 812591 | 0.27 | 0.24 | 0.55 | 0.0 |
| Verspoor | 0.0 | 0.0 | 0.68 | 0.18 |
| Cleland | 0.0 | 0.0 | 0.68 | 0.39 |
| 1287621 | 0.38 | 0.37 | 0.0 | 1.0 |
| Beason | 0.29 | 0.4 | 0.0 | 1.0 |
| Ambrosiano | 0.33 | 0.37 | 0.0 | 1.0 |
| Sims | 0.0 | 0.52 | 0.0 | 1.0 |

| Group selected profiles | View domain-based network | Sort by distance to selected |
|---|---|---|

FIG. 17

SYSTEM AND METHOD FOR KNOWLEDGE BASED MATCHING OF USERS IN A NETWORK

STATEMENT REGARDING FEDERALLY SPONSORED RESEARCH OR DEVELOPMENT

This invention was made with Government support under Grant No. DE-AC52-06NA25396, awarded by the Department of Energy. The Government has certain rights in this invention.

CROSS-REFERENCE TO RELATED APPLICATIONS

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to strategic collaboration, and more particularly to knowledge-based matching and networking.

2. Description of Related Art

The need for innovation and the challenges of fostering it are well appreciated. Matching individuals with knowledge in a particular area with those in need of a particular skill set is a problem pervasive throughout all industries.

Existing methods for matchmaking (e.g. eHarmony's U.S. Pat. No. 6,735,568) utilize a pairwise "satisfaction index" derived from factors elicited through survey questions and empirical data analysis. Other methods for characterizing social networking relationships (e.g. IBM's U.S. Pat. No. 7,177,880) address identifying personal relationships between users through analysis of contacts and email logs, or to allow users to specify those personal relationships themselves (e.g. Friendster, mySpace.com, LinkedIn).

BRIEF SUMMARY OF THE INVENTION

The system and methods of the present invention use strategic collaboration to enhance social networking for problem solving by knowledge-based "matchmaking". I.e., it identifies clusters of users that share similar interests based on a knowledge model of concepts in a given knowledge area.

The present invention is based on strategies intended to complement ongoing approaches and leverage existing efforts, in particular promoting innovation across a diverse community of technology producers, consumers, and brokers, instead of the typical organization-centric solution.

The methods and system of the present invention foster the natural tendency of people to network as a means of solving difficult problems, and enhance the potential of individuals to self-organize into communities of interest (COIs) comprised of technology producers, consumers and brokers with shared goals, challenges and solution strategies. The system promotes resource sharing and collaboration among existing or emerging innovation centers.

The present invention uses a knowledge-based approach to matchmaking and social network extension. In particular, the system is configured to allow users to specify "knowledge profiles," which are collections of concepts that indicate a certain topic or area of interest selected from an ontology (domain knowledge model). Interest in a given area may, for example, be due to capabilities that a user wants to offer, or conversely, to an area of interest in which the user has a need or requires a solution to a problem.

The system also utilizes the knowledge model as the semantic space within which to compare similarities in user interests. The knowledge model is hierarchical so that indications of interest in specific concepts automatically imply interest in more general concepts, i.e. subsumption of concepts is implied. Similarity measures between profiles may then be calculated based on suitable distance formulas within this space, for example, vector-based (cosine) distance measures. These calculated similarities are one of the bases of matching and clustering users.

The system and methods of the present invention also incorporate the use of "knowledge domains", i.e. some portion of the ontology corresponding to a semantic subspace. This helps to assign meaning or interpretation to subspaces in which users cluster. The domain concept is further used to link additional users by implementing a mechanism by which users in one domain can be semantically connected to users in a separate domain through the use of "crossover" profiles that indicate interest in more than one domain at the same time.

Visualization of the social network may also be incorporated by analysis of knowledge profiles in this semantic space so that users can explore the space user interests to see to whose interests their interests are most closely related.

Finally, a natural language interface is used to allows user to indirectly specify knowledge profiles in an area of interest by writing short, free text descriptions or by uploading documents that they believe exemplify them. Terminology employed by the user is then used to match ontology concepts.

The invention allows a user to identify other people or organizations (generally, users) with whom he or she may wish to communicate or interact in a collaborative setting. Examples include (a) users with whom he or she may wish to collaborate or with whom he or she may wish to form a community of interest, (b) users that have a need for which the user may be able to provide a capability, (c) users that have a capability for which the user has a need, (d) other users that have a need or capability that is complementary to or an extension of the user's own. This invention can further be used for gap analysis—i.e. discovering needs where there are no existing capabilities. In general, the invention is intended to enhance the ability of individuals to form and exploit social networks in order to generate innovative solutions. Sociological research indicates that effective use of social networks is a key determinant of success in problem-solving and innovation-enhancing activities.

The system and methods of the present invention may be used as the core element of a digital service to enhance the ability of users to form effective collaborative social networks to find innovative solutions to problems in an area of shared interest. It may be deployed as an intranet service within an organization or on the Internet to link multiple organizations together. Organizations could deploy or subscribe to the service as part of ongoing innovation-promoting efforts. It could also be used as a basic resource by government or industry consortia to promote collaboration.

An aspect of the invention is a method of matching a first user with a second user within a network of users. The method includes the steps of generating an ontology having a plurality of concepts arranged within a hierarchical knowledge profile having at least a first upper-level tier and a second lower-level tier, and matching the first user and the second user as a function of their association with one or more concepts within the knowledge profile. In particular a user's interest in a concept located within the second lower-level tier subsumes interest in a broader concept in the first upper-level tier. The ontology may comprise any number of tiers, e.g. first tier, second tier, third tier, ... $n^{th}$ tier. As well, there is no limit to the number of users in the network.

In one embodiment of the present aspect, a first individual knowledge profile is generated for the first user based on concepts associated with the first user, and a second individual knowledge profile is generated for the second user based on concepts associated with the second user. As such, matching the first user with the second user is done by calculating the distance between a selected concept located in both the first and second individual knowledge profiles.

In another embodiment, the first and second individual knowledge profiles are combined to generate the hierarchical knowledge profile. The first and second individual knowledge profiles may be viewed as sub-graphs in the hierarchical knowledge profile.

In another embodiment, the first and second individual knowledge profiles comprise pathways connecting concepts on the first tier and second tier, and potentially all the way up the hierarchy, wherein the number of times a key term appears in a pathway form matrix vectors, and wherein the distance between the selected concept is computed by calculating the distance between matrix vectors.

In yet another embodiment, the method may include forming a network of users by selecting a threshold distance between users. A crossover profile may also be generated indirectly linking a third user to the first user, wherein the first and third user's interests extend over a plurality of hierarchical knowledge profiles.

The users may consist of: knowledge providers, knowledge consumers, and knowledge brokers.

Another aspect is a system for matching a first user with a second user within a network of users. The system includes a database having at least one ontology having a plurality of concepts arranged within a hierarchical knowledge profile, wherein the knowledge profile comprises a first upper-level tier and a second lower-level tier (up to n-level tiers), wherein a user's interest in a concept located within the second lower-level tier subsumes interest in a broader concept in the first upper-level tier. The system further includes an interface allowing the first and second user to select in interest in one or more concepts. Finally it includes a processor configured to match the first user and the second user as a function of their association with concepts within the knowledge profile.

In one embodiment, the interface is configured to generate a first individual knowledge profile for the first user based on concepts associated with the first user and a second individual knowledge profile for the second user based on concepts associated with the second user. Here, the processor is configured to match the first user with the second user by calculating the distance between a selected concept located in both the first and second individual knowledge profiles.

The interface may also comprise a graphical user interface that allows the users to graphically view the hierarchical knowledge profile. The graphical user interface may be configured such that the hierarchical knowledge profile can be viewed as: a collection of pathways, a set of sub-graphs, and a collection of key terms.

In some embodiments, a user may select an interest in one or more concepts to generate the first individual knowledge profile.

The processor may also be configured to combine the first and second individual knowledge profiles to generate the hierarchical knowledge profile.

In another embodiment, the first and second individual knowledge profiles comprise pathways connecting concepts on the first tier and second tier, wherein the number of times a key term appears in a pathway form matrix vectors. Furthermore, the processor is configured to calculate the distance between the selected concept by computing the distance between matrix vectors.

Another aspect is a method of matching a first user with a second user within a network of users, comprising providing a database of a plurality of knowledge concepts arranged within a hierarchical knowledge profile, the knowledge concepts having upper-level concepts and lower-level concepts disposed along pathways within the hierarchy. Wherein a user's interest in a lower-level concept subsumes interest in any upper-level concept along a pathway in the hierarchy, such that the first user and the second user may be matched as a function of their association with one or more concepts within the knowledge profile.

In some embodiments, matching the first user with the second user comprises calculating the distance between concepts on said pathways.

In another embodiment, a first individual knowledge profile is generated for the first user based on concepts associated with the first user, and a second individual knowledge profile is generated for the second user based on concepts associated with the second user, wherein the first and second individual knowledge profiles are combined to generate the hierarchical knowledge profile.

The first user may comprises a knowledge provider having an interest or knowledge in a desired concept, and the second user comprises a knowledge consumer having a need for said desired concept.

Alternatively, the first user may comprise a knowledge broker having an association with a desired concept, wherein the second user comprises a knowledge consumer having a need for said desired concept.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIG. 11 illustrates a screen of a list of profiles named for their respective users.

FIG. 13 shows the screen of FIG. 11 with the profiles sorted by distance from the selected profile at the top of the list.

FIG. 16 illustrates the profiles sorted by distance from the profile of a user based solely on an interest/knowledge of WMD technology.

FIG. 17 illustrates the profiles sorted by distance from the profile of a user based solely on an interest/knowledge of WMD operations.

DETAILED DESCRIPTION OF THE INVENTION

Referring more specifically to the drawings, for illustrative purposes the present invention is embodied in the apparatus generally shown in FIG. 1 through FIG. 18. It will be appreciated that the apparatus may vary as to configuration and as to details of the parts, and that the method may vary as to the specific steps and sequence, without departing from the basic concepts as disclosed herein.

The system and methods of the present invention are centered around the concept of interpersonal networking facilitated by a unique knowledge-based service called "knowledge profile matching". Under knowledge profile matching, the interests, goals, and capabilities of individuals are represented in terms of key concepts in the context of a given problem area. A knowledge profile is a collection of concepts/subjects and their generalizations that is indicative of a person's or organization's interests or expertise.

Figure 1:
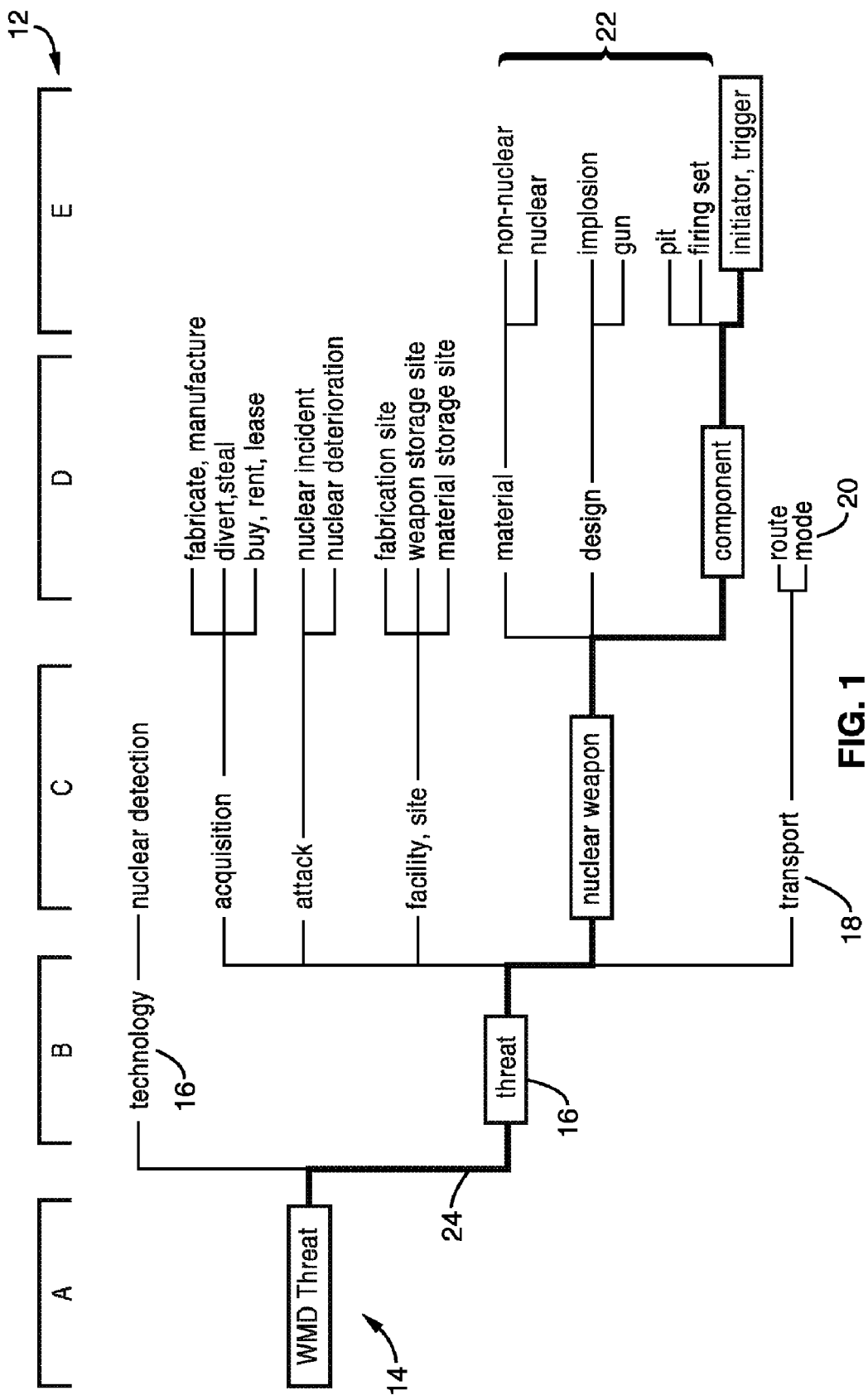
FIG. 1 illustrates a hypothetical knowledge model in accordance with the present invention.

FIG. 1 illustrates a portion of an exemplary hypothetical knowledge model 10 related to the WMD threat problem. It is appreciated that the knowledge model 10 may comprise any number of different subject areas, e.g. the knowledge model may be based on expertise in microprocessor design within the semiconductor/electrical engineering field.

As shown in FIG. 1, knowledge model 10 comprises one or more tiers or levels (A-E) 12 wherein an interest or knowledge of a particular subject 14 may fall. The top of the hierarchy divides concepts into the broad areas of technology, and threat. Technology includes concepts like nuclear materials detectors and chemical-biological agent detectors. The threat area contains concepts related to the various stages and decision points of a potential WMD attack. We see, for instance, concepts like acquisition, and attack. These in turn contain concepts like the choice of whether to buy, steal, or fabricate a weapon.

Indications of interest or knowledge of a given concept or subject 14 necessarily imply a connection to more general concepts. For example, the figure shows that interest in nuclear weapons triggers 22 at lower-level tier E implies an interest in nuclear weapons components 20 at the next-level tier D, and nuclear weapons 18 at tier C, which are part of the overall WMD threat subject 14 at upper-level tier A. The pathway 24 is shown between the selected concept 22 and the ontology 14.

Knowledge models, like the one shown FIG. 1, may require effort to develop, and are therefore often products of a given community of interest. In this case, the community dedicated to addressing the WMD threat has already done much of the work required to characterize the WMD threat.

The approach of the present invention is to capture the concepts in existing models to produce a concept hierarchy as shown in FIG. 1. These knowledge models 10 are then combined with concepts extracted from existing data bases of operational needs and technical capabilities.

The knowledge model of the present invention goes beyond the typical "bag of words" approach to finding similarities among areas of interest described in natural language. With the hierarchical approach, when a more general term is used in one case and a more specific term in another, that they will still match. The same is true when one description refers to the whole and another to the parts. This is called subsumption matching.

The system of the present invention is configured such that the knowledge models may be continually updated and revised, such that after synthesis of an initial model from existing sources, further elaboration and synthesis of concepts for inclusion in knowledge models may be performed by either the system programmers or by member organization or participants. For example, member organizations and participants may add considerable value to the community perspective on the WMD problem a shown in FIG. 1, because of their shared interest in curating a WMD threat model with broad applicability.

Knowledge profile matching, as used in the system and methods of the present invention, finds similarities in the interests/knowledge subjects of individuals by comparing the concepts contained in knowledge profile 10. These profiles may be captured in a number ways, for example through questionnaires or surveys, as well as by extracting key words from documents.

Figure 2:
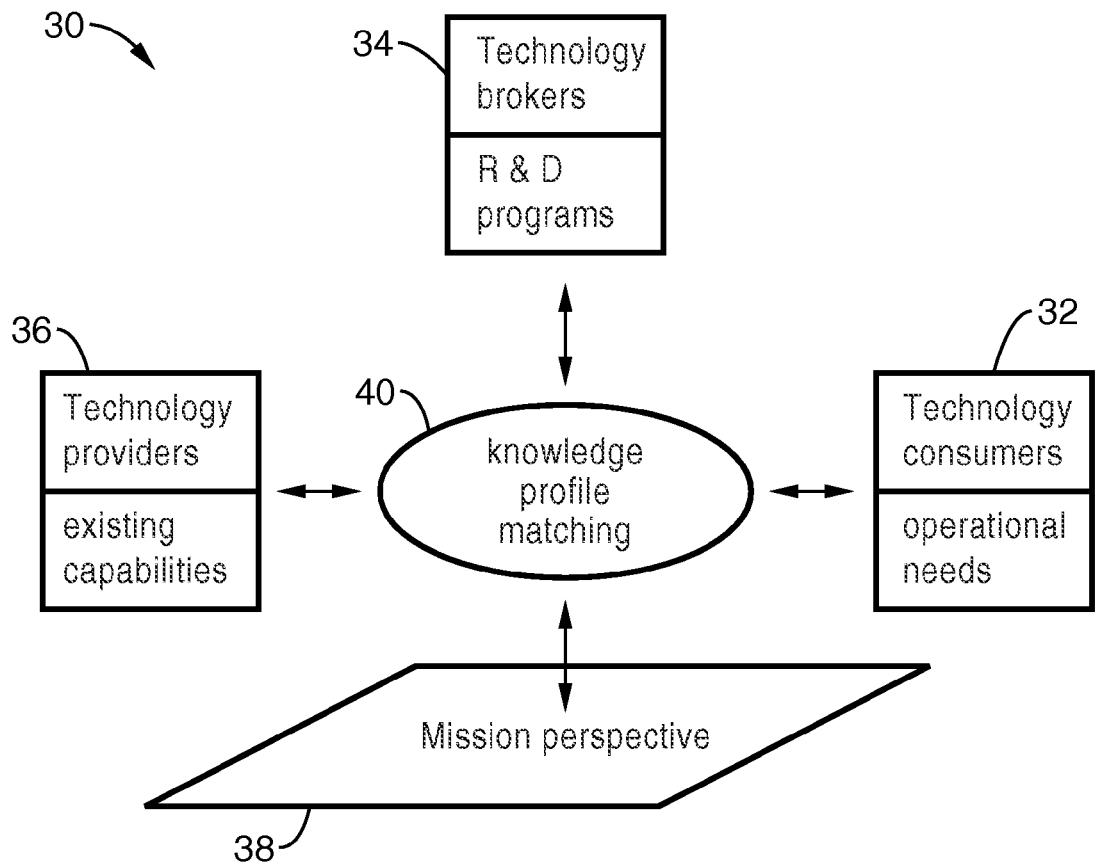
FIG. 2 is a diagram of an architecture for social networking via the knowledge profile matching system of the present invention.

FIG. 2 illustrates an exemplary architecture 30 for maximizing individual interactions through the method of the present invention. Individuals seeking to network with others can be grouped into three categories: (1) technology (knowledge) consumers 32, i.e. people with operational needs; (2) technology (knowledge) providers 36, i.e. those with existing capabilities or interests and (3) technology (knowledge) brokers 34, such as R&D program managers. All are joined by a common interest 38 in the mission through knowledge profile matching system 40, with the technology consumer generally being the one with the most direct link.

Matching individual profiles might be used to link individuals from each area, or within an area. For example, it could match technology providers 36 to a program manager 34 looking for solutions within his portfolio, or could match people with operational needs 32 to an appropriate program manager 34, allowing them to express their requirements more directly.

Figure 3:
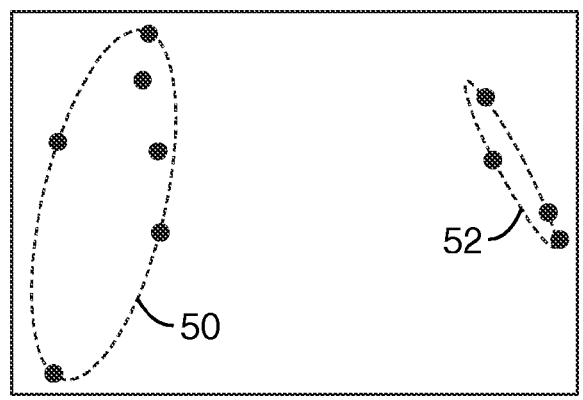
FIG. 3 is a diagram illustrating gap analysis.

Referring now to FIG. 3, the knowledge profile matching system 40 of the present invention may also be used to uncover patterns related to program gaps or to program elements without immediate needs. FIG. 3 shows points representing knowledge profiles that have been clustered using standard methods. Two groups 50 and 52 are shown, which could suggest possible communities of interest. For purposes of illustration, red squares indicating needs and green dots indicate existing programs or capabilities. In either group, red squares far from any green points could indicate a potential gap, whereas green points far away from any red squares might suggest a program area that is oversubscribed.

Figure 4:
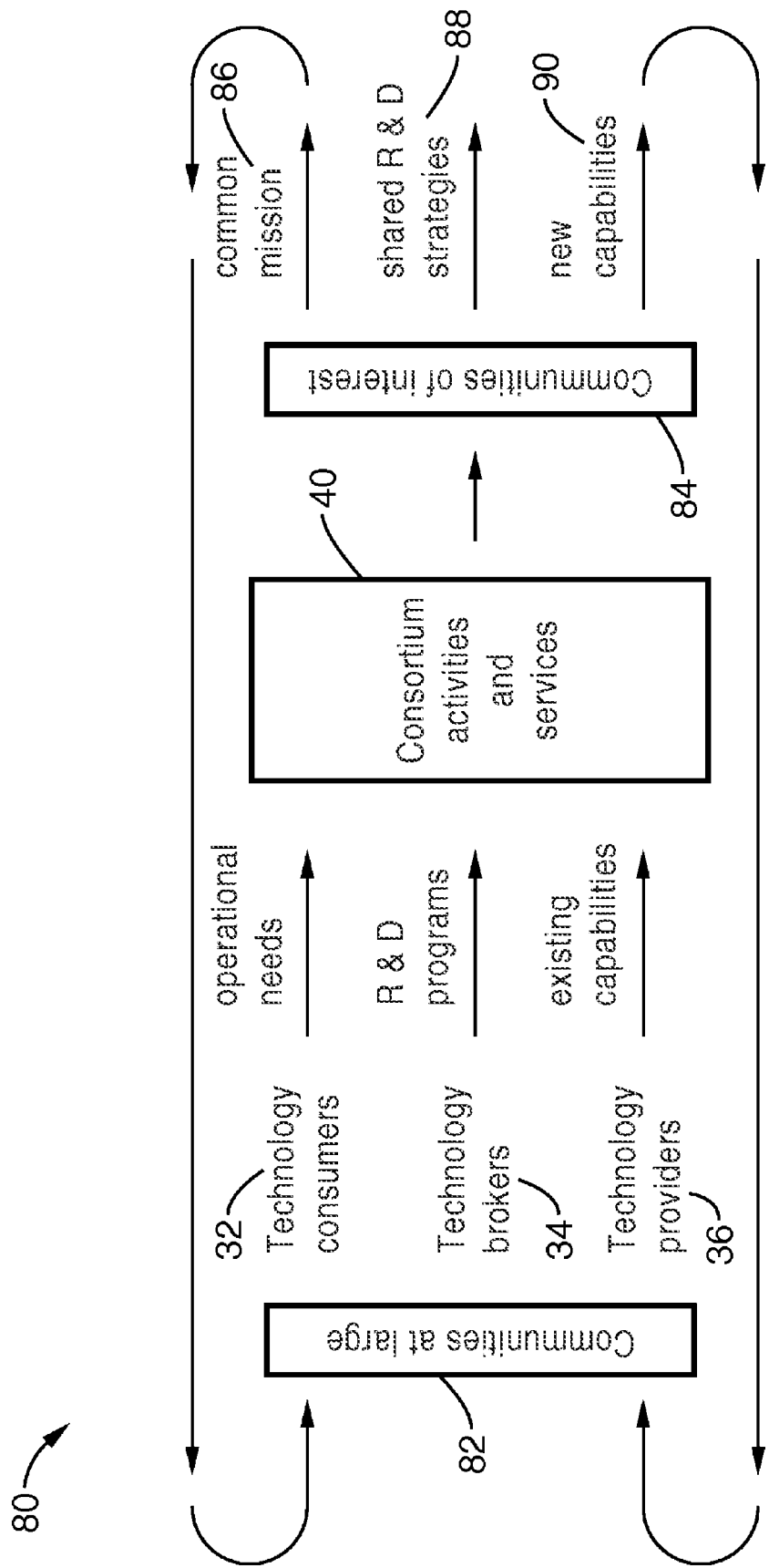
FIG. 4 shows a model of technology producers, consumers and brokers in the community at large contributing their interests and knowledge via participation in the knowledge profile matching.

The system and methods of the present invention may support several levels of self organization, including the development of communities of interest. Many organizational approaches to both collaboration and innovation recognize the value in these ad hoc social networks that form in response to shared goals or concerns. FIG. 4 illustrates a system architecture 80 for supporting communities of interest.

As seen in FIG. 4, technology producers 36, consumers 32, and brokers 34 in the community at large 82 (i.e. everyone) contribute their interests and knowledge via participation in the knowledge profile matching system 40 of the present invention. For example, they may use the knowledge profiling services of system 40 to match a need to an existing capability, or they may participate in forums or marketplace-style workshops available through the system 40. These interactions can lead to the formation of communities of interest (COI) 84. From the established COI 84, a common mission area 86 may be identified, or a shared set of R&D strategies 88 articulated. Eventually results in the form of new capabilities 90 may be achieved. All of this feeds back to help the community at large 82.

The present invention emphasizes two aspects of COI's: (1) the desire form COI's routinely across organizations including non-DoD organizations, and (2) the need to foster COIs that are closely aligned with DoD mission areas. The present invention may further promote these aspects by providing services that not only foster the formation of COIs, but track their progress.

Generally, there is strong interest in innovation and promoting innovation through collaboration and information sharing nearly everywhere.

There are also a number of facilities just currently available that provide much of the basic infrastructure required the method and system of the present invention. For example, the Network-Centric Enterprise Services (NCES), recently deployed by the Defense Information Systems Agency (DISA) with the help of IBM, offers a wide range of generic, collaborative computing and information services.

Looking at the emergence of such facilities and centers across the spectrum of organizations and enterprise sectors suggests another natural level of organization—the level at which innovation centers come together. "Innovation center" generally means any facility, program, group, or other entity that has been created to address the need for innovation. Nearly all recognize the need for information sharing within a networked computing infrastructure.

Considering the scope of these activities suggests that these "centers" of innovation will soon look for opportunities to interact at a peer level. This is natural because of the need to share resources, and for those that emphasize information services to address the potential problems of information exchange and system interoperability.

Figure 5:
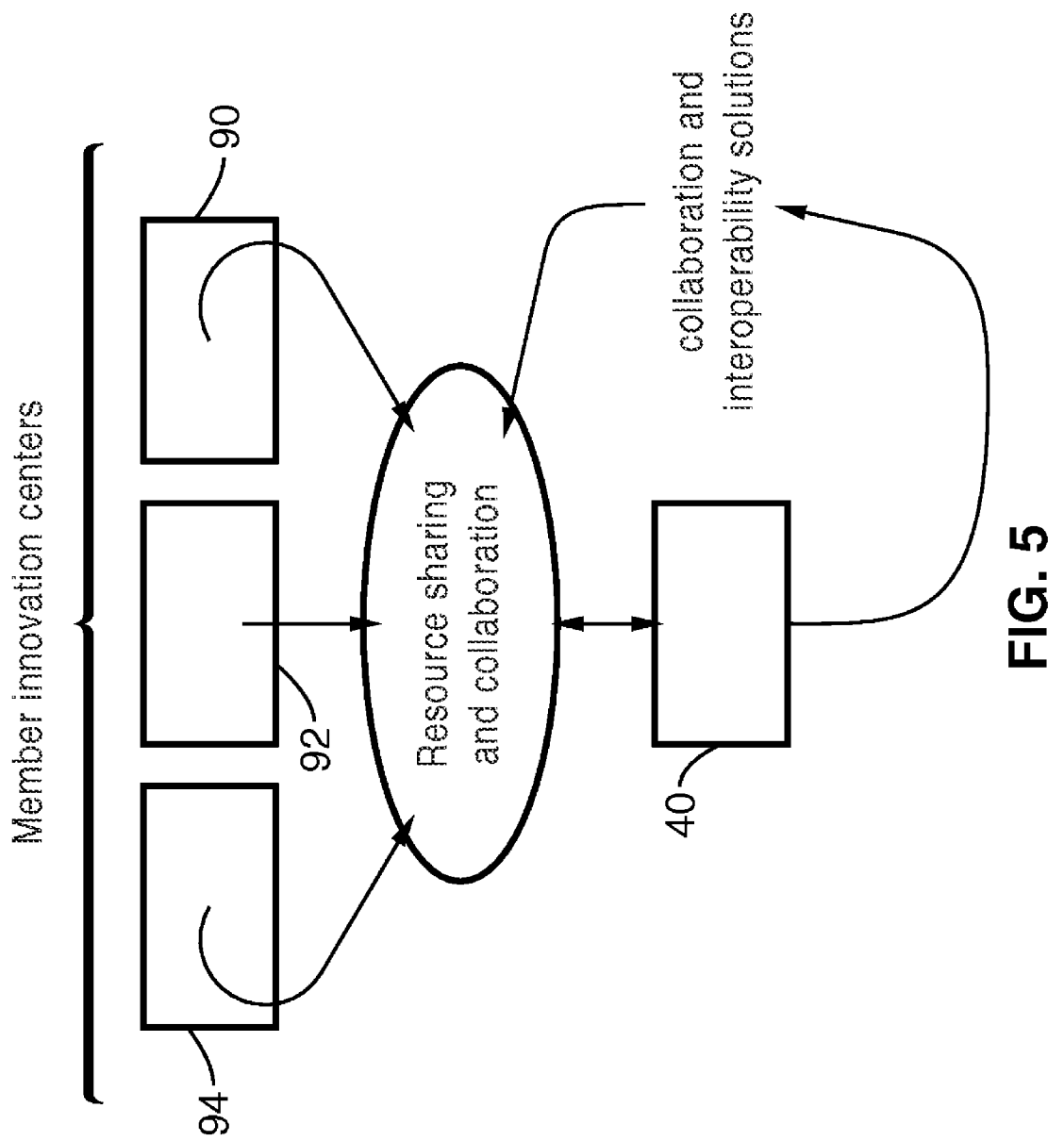
FIG. 5 is a diagram of an architecture of member innovation centers participating through the knowledge profile matching system of the present invention.

The architecture relating to this level of interaction is shown in FIG. 5, which shows a group of member innovation centers 90, 92, 94 who participate, through the knowledge profile matching system of the present invention, in collaboration and resource sharing. Peer-level activities supported by the system 40 encourage the exchange of ideas across the centers. For example, different centers may want to share success stories as well as lessons learned. They may want to investigate the best ways to structure their organizations. Consortium members may also be concerned about how best to engage a particular type of customer or technology sector, and so on.

In addition to collaboration in areas of mutual interest, the greatest benefit may come from merging information resources so that they can be shared across the consortium.

Figure 6:
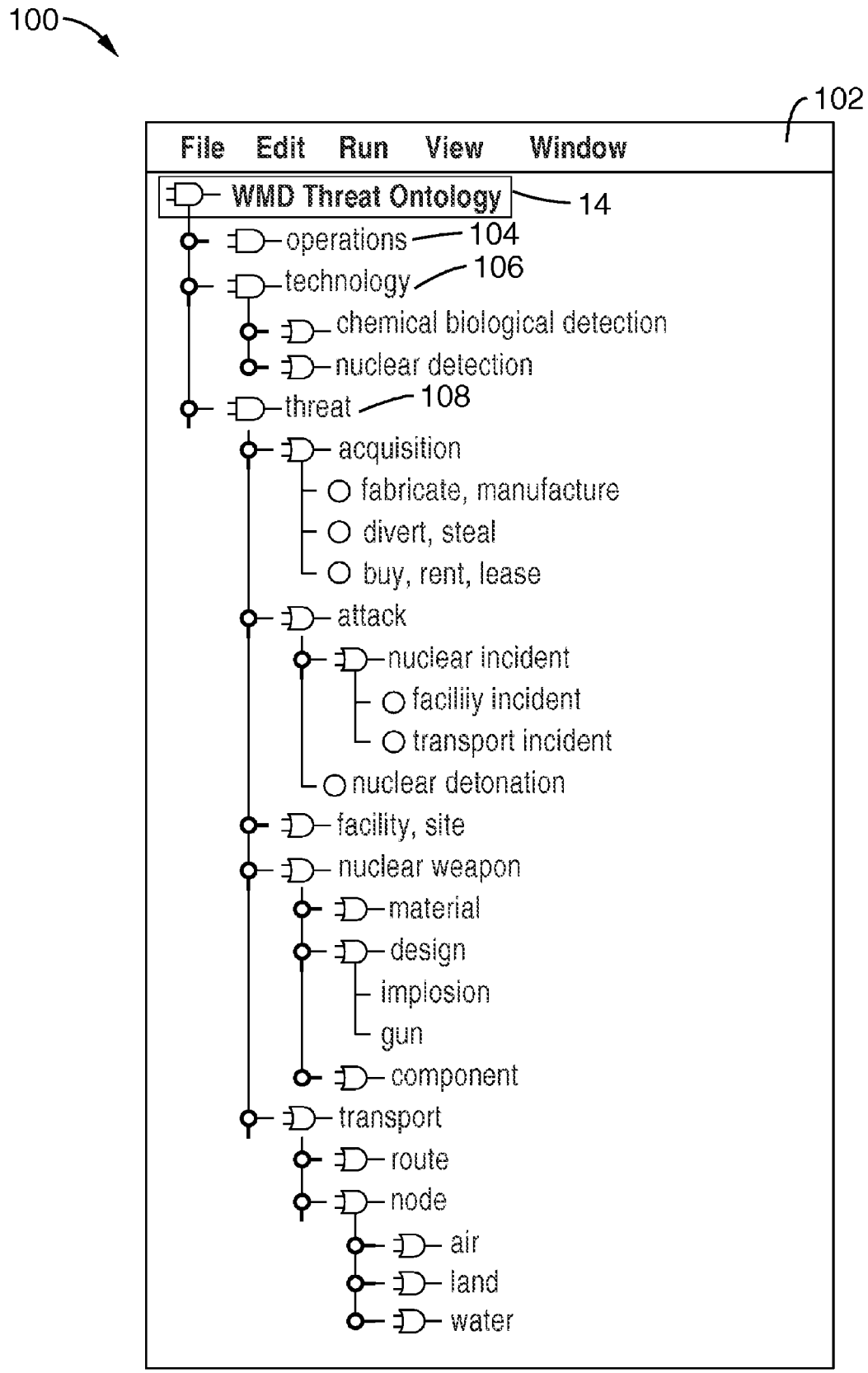
FIG. 6 is a screen view of a computer based knowledge model profile.

FIG. 6 illustrates a screen shot of part of a hypothetical knowledge model 10 implemented within a software program. The menu bar 102 may be used to select a specific ontology, in this case WMD threat 14. Each concept may be individually selected for view so that the concepts of lower level tiers under the concept are open or closed for viewing. For example, operations 114 is shown closed in FIG. 6, while the other concepts at that tier, technology 106 and threat 108 are open.

Figure 7:
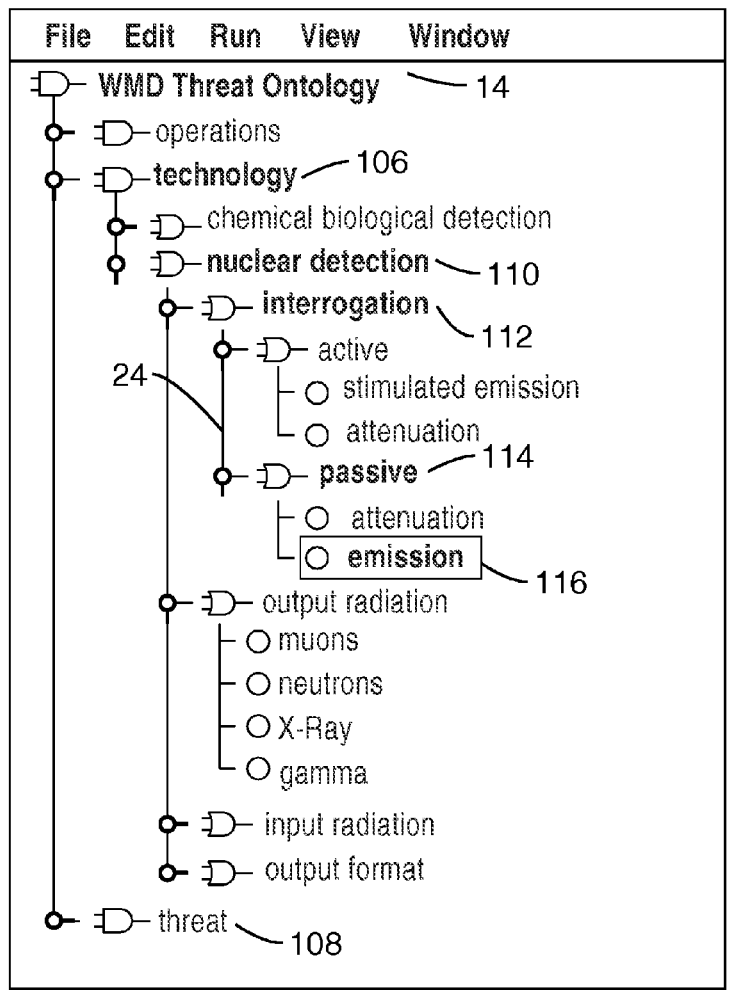
FIG. 7 is a screen view of knowledge profile of FIG. 6 with a concept selected.

FIG. 7 shows screen 100 having the concept emission 116 selected. The pathway 24 (shown bolded) includes passive interrogation 114 within nuclear detection 110 under the technology 106 branch of the WMD ontology 14. Selection of a concept (e.g. 116) in the hierarchy implies at least some interest in the path 24 leading upward from the indicated concept. As concepts are selected, along with their implied pathways in the concept hierarchy, a profile of concepts is built up. This profile can be viewed in at least three ways: (1) as a collection of pathways, (2) as a set of sub-graphs within the overall model, and (3) as a collection of key terms.

Figure 8:
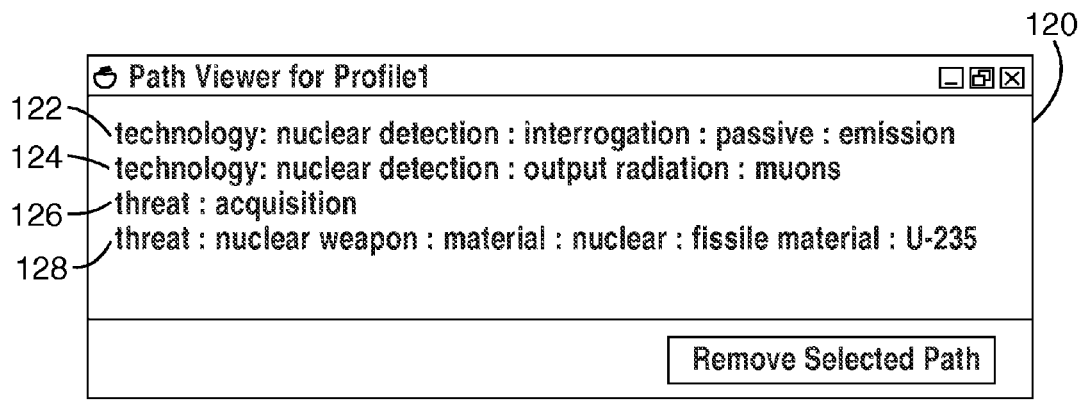
FIG. 8 is a screen view of the paths selected for a particular profile.
Figure 9:
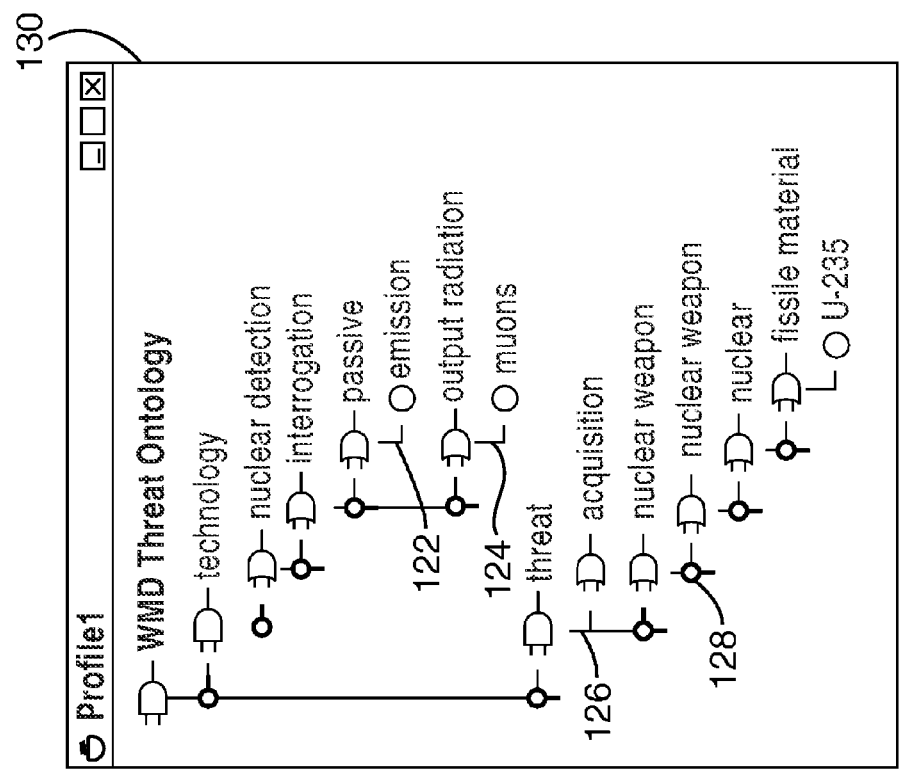
FIG. 9 is a hierarchical view of the paths selected in FIG. 8.

FIG. 8 illustrates a screen 120 for viewing a profile formed by selecting four concepts, each with corresponding paths 122-128 in the ontology. FIG. 9 shows a screen 130 of the paths 122-128 selected for Profile 1 in FIG. 8. The paths 122-128 have been merged into sub-graphs of the knowledge model. Table 1 lists the set of key terms formed from the union of all the unique terms in the profile.

Each of the above views (FIGS. 7-9) is useful in a different context. The set of pathways is central in that it provides the basis for the sub-graph view as well as for the set of key terms. The sub-graph is the most efficient view of the knowledge area spanned by the chosen concepts. Finally, the list of key terms is preferably input to algorithms (discussed in further detail below) that match interest areas represented by the knowledge profiles.

There are a number of ways that concepts in the knowledge model may be indicated. For example, key terms may be selected directly through a user interface such as a pull-down list. For example, there may be a data entry screen comprising a number of blanks or forms for a user to fill out. For example, the system or user interface may include a page where the user has provided basic contact information and gives a description of his professional background and general interests, describes specific areas of interest, identified the members in his current social network, and detailed participation in specialized communities of interest is managed Alternatively, text analysis may be applied to extract concepts from free-text descriptions. Free-text descriptions could come from documents provided by users, or by users filling out free-text fields a user interface form. An example of how this would work is given by first considering in the text passage below:

"The adversary is expected in this instance to divert, steal a nuclear weapon, or divert fissile material. If fissile material is diverted, they will be likely to build a gun weapon. A seaport is the most likely route for the diversion. A nuclear detonation would be the expected aim."

Figure 10:
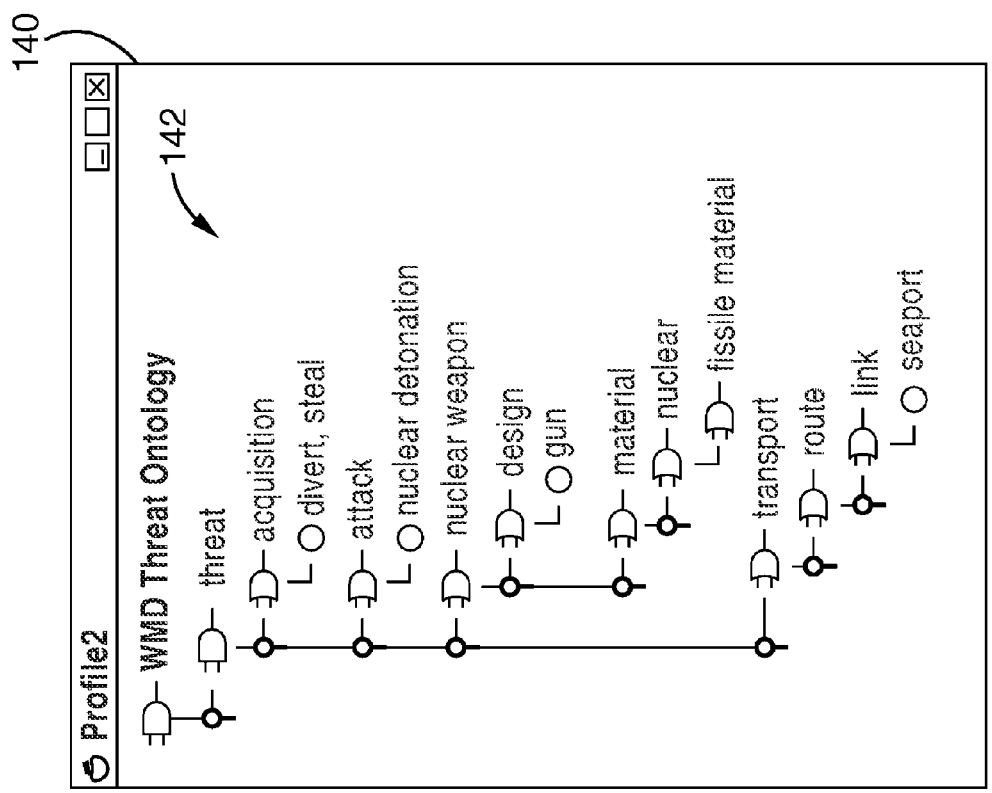
FIG. 10 is a hierarchical view of a second profile.

In the system of the present invention, the text is parsed to extract key terms present in the overall knowledge model. FIG. 10 illustrates a view 140 of a knowledge profile 142, which was extracted from key terms embedded in above text passage, and represented as a sub-graph of the overall knowledge model.

The knowledge profiles of a particular user are then compared to the profiles of other users to measure how closely their interests align.

To illustrate how knowledge profile comparisons would be performed, FIGS. 11-18 illustrate a set of hypothetical profiles representing differing areas of interest. Each profile is associated with a hypothetical user. FIG. 11 illustrates a screen 150 of a list of individual profiles 152-164 named for their respective users. The individual profiles may be labeled with numbers (e.g. profiles 152 and 154) to shield the identity of the user. This may be performed in a social networking application to ensure the privacy of members on the network who are not known to the user performing the query.

The table viewer 150 of FIG. 11 comprises a table with a plurality of columns. Several of the columns (e.g. 166, 168, and 170) represent knowledge categories or topic areas to which concepts in the model belong. The numbers in each of these columns represent the relative portion of the each topic area that the profiles cover. As illustrated in FIG. 11, some profiles may show interest or association in all areas while some are more limited. For example, the Sims 162 profile indicates interest only in the threat topic, while the Ambrosiano and Beason profiles 158,156 highlighted in the figure evidently share interests in both technology and threat.

The two highlighted profiles 156, 158 shown in FIG. 11, may be grouped (e.g. by clicking button 174) to obtain a picture of the "knowledge zone" that covers both profiles. This zone is visualized in the overall profile 182 shown in screen 180 in FIG. 12. Concepts that the two profiles 156, 158 have in common are highlights.

Figure 12:
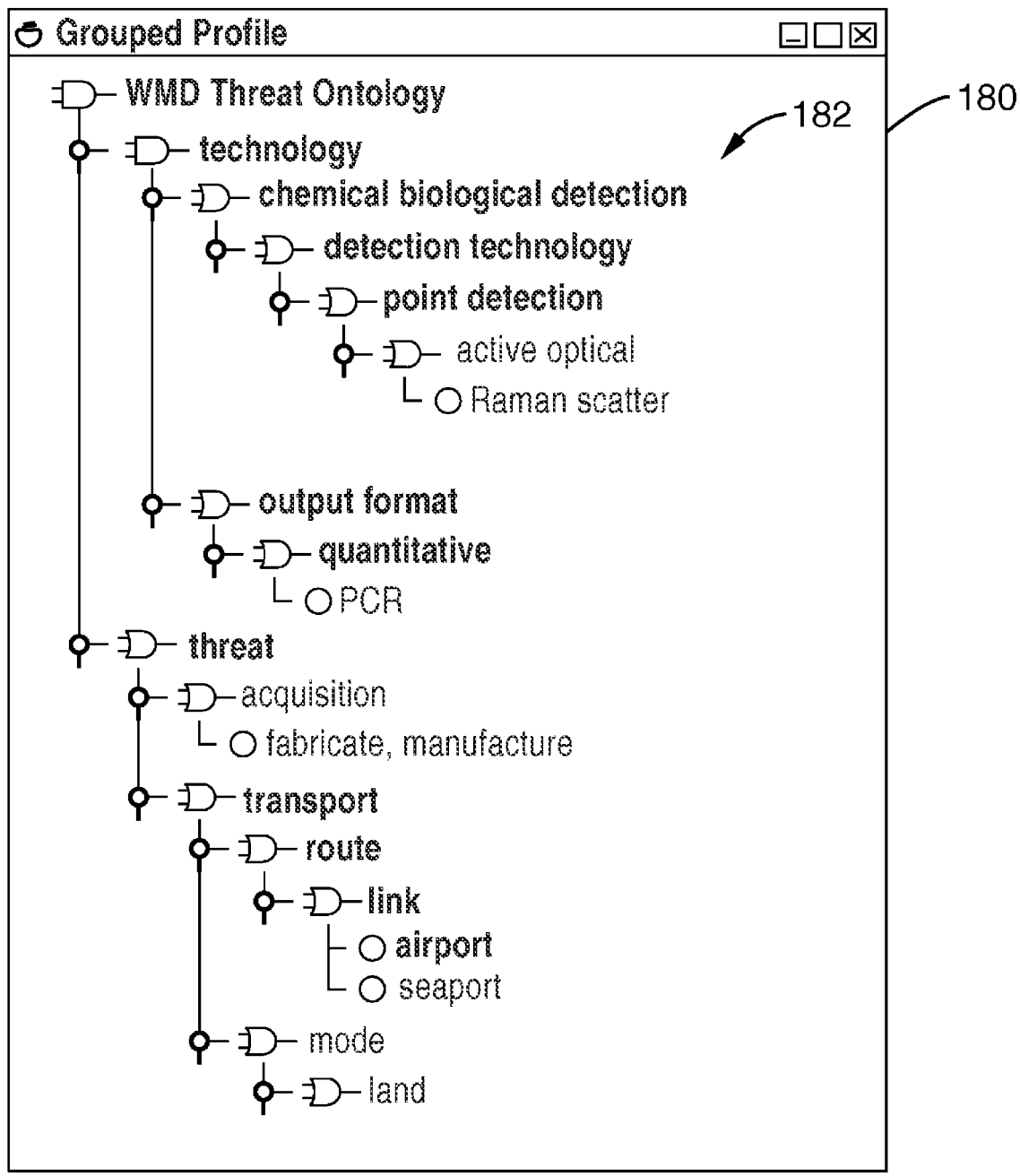
FIG. 12 is a hierarchical view of two of the profiles selected in FIG. 11.

The relationships in the hierarchy primarily comprise of two types: category-subcategory ("is-a") relations, and whole-part ("has-a") relations. Which relationship applies is usually clear from the context. In FIG. 12 for example, "acquisition" and "transport" are parts of the overall threat problem, whereas "PCR" is a kind of "quantitative output." These relationships intuitively suggest containment, so their presentation as a set of nested elements, like nested folders in a computer directory, is easy for users to grasp.

FIGS. 11 and 12 provide a numerical and visual comparison of the knowledge profiles of different users based on a hierarchical knowledge model.

The "distance" between the interests represented by any selected profile and all others can be evaluated. FIG. 13 shows a view 190 of the table of FIG. 11 with the knowledge profiles associated with the interests of different users sorted by distance from a selected user (e.g. profile 156 was highlighted and button 178 toggled). This is achieved by compressing the collection of pathways for a given profile into a list of key terms. An example is given in Table 2, which records the number of times a key term appears in the pathways of a given profile to form a matrix. The rows of the matrix are vectors in the space of key terms. It is appreciated that other ways of scoring terms in the matrix consistent with methods available in the art may be used.

The basis for comparison is the similarity between any two profiles computed with an appropriate metric. Any of a number of suitable similarity metrics known in the art for document clustering could be used. In the present example, the cosine distance metric was used. The cosine distance between any two profile vectors P1 and P2 is given by Equation 1:

$$d_{12} = 1 - \cos\theta = 1 - \frac{P_1 \cdot P_2}{|P_1||P_2|} \quad \text{(Eq. 1)}$$

Other metrics available in the art may include the Euclidean distance, Hamming distance, and Manhattan distance, etc. For the matrix in the Table 2, this distance is 0.08, a relatively small distance consistent with the similarity between the two vectors, as is evident in the table by inspection.

As shown in FIG. 13, distances were computed, using Equation 1, from the selected profile of Ambrosiano 156 and sorted them in increasing order. From this we can see that Beason's profile 158 is the closest, while those of Cleland 160 and Verspoor 164 are as far removed from the selected profile as possible. This makes sense, as Cleland 160 and Verspoor 164 have interests that lie only in the operations topic area while Ambrosiano 156 and Beason 158 apparently have no interest in operations.

From the complete matrix of distances (i.e. the matrix of distances between any two profiles) a network of close proximity relationships can be synthesized. By changing the threshold distance (in the range [0,1]) for any two profiles to be considered in close proximity, networks with different degrees of connectivity may be created.

The user may choose to find members with areas of interest matching his own. The system 40 does this by extracting terms, matching them to the reference hierarchy, and then comparing the terms in the user's area of interest to those of other members. The visualization in FIG. 14 shows a network of members whose areas of interests closely match the user's area.

As a practical matter, the user can threshold the matching distance to control the extent of the resulting network. For example, the matching distance can be scaled to fit the interval between zero and one. A zero would mean that the member's concepts exactly match the user's concepts, and a "1" value would indicate that there are no matches between the member and the user's concepts. As we slide the threshold toward the lower end, only members in the immediate the neighborhood of the user's interest area will show up. On the other end, as the threshold moves to one, every member subscribed to the service will eventually be included.

Figure 15:
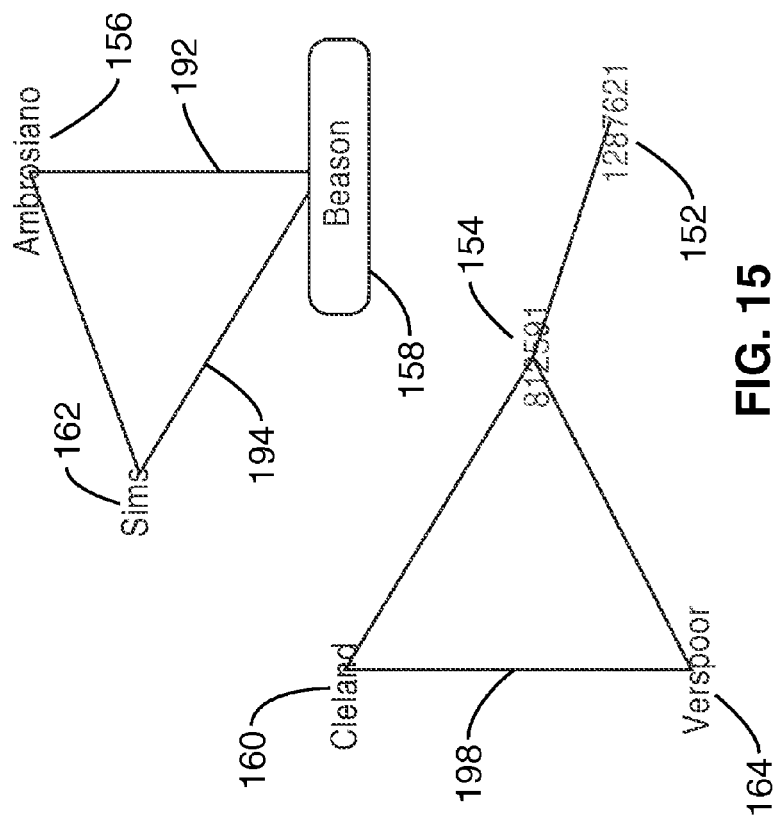
FIG. 15 illustrates a network of profiles where the threshold distance for proximity is set to 0.8.
Figure 14:
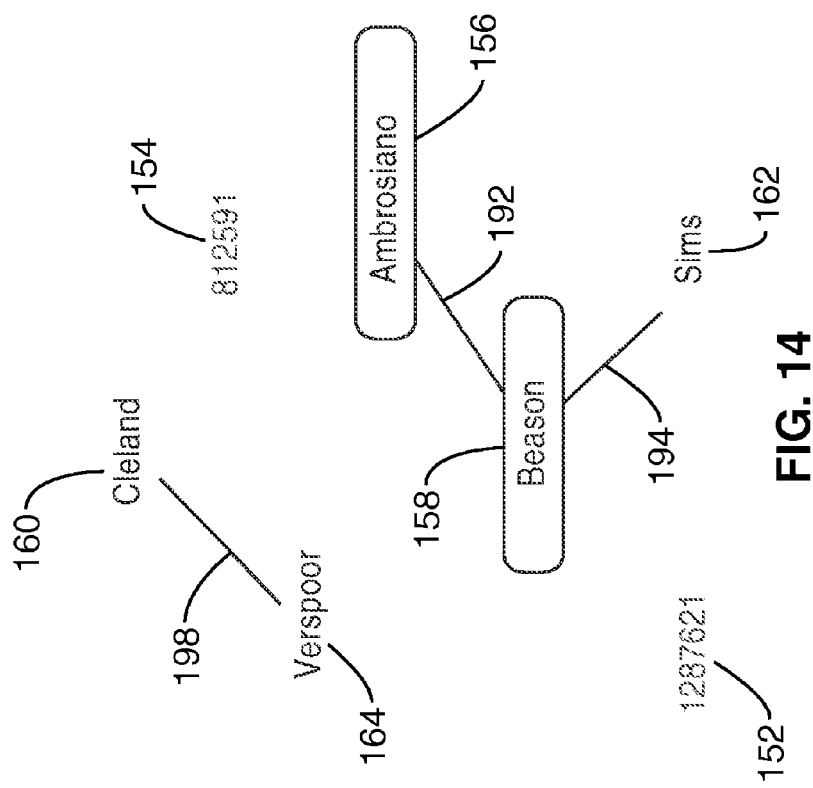
FIG. 14 illustrates a network of profiles where the threshold distance for proximity is set to 0.5.

FIG. 14 shows a network for a threshold of 0.5, while FIG. 15 is a network where the threshold is set at 0.8. In the network shown in FIG. 14, there is a direct connection 192 between Ambrosiano 156 and Beason 158, and a connection 194 between Beason 158 and Sims 162, indirectly linking Ambrosiano 156 and Sims 162. A second sub-network connection 198 links Verspoor 164 and Cleland 160. By increasing the threshold for close proximity as illustrated in FIG. 15, a direct connection 196 between Sims 162 and Ambrosiano 156 in one sub-network, and linked in the numbered profiles 152 and 154 in the second sub-network.

The knowledge-model-based matching methods discussed above may also be used to link through the interests of an intermediary participants that appear to have no direct connection. This is called "matching by crossover profile."

Looking at the coverage scores in either FIG. 13 or 16, it is apparent that some profiles have coverage in only specific area, while others show interest in several areas at once. Profiles that cover multiple areas are called "crossover profiles." These profiles can be used to join members having no direct proximity.

As an example, consider the profile 154, labeled 812591, which spans all three interests. It is possible to match people whose interests are in operations to those with an interest in technology through a third party with an interest in both.

If distances from profile 154 are computed based only on technology, the results shown in the screen 200 of FIG. 16 are obtained. The profile closest to profile 154 in the technology area is the 1287621 profile 152. If on the other hand, profiles are sorted by distance based only on the operations area (as shown in FIG. 17), the closest profile to profile 154 is the Verspoor profile 164.

The use of crossover profiles allows the interests of people to be indirectly linked through the broader interests of a third party. This match can be made because the semantics of the underlying knowledge model, and the concept of using crossover profiles, provides a connection between people who would not otherwise know that they have related interests.

This indirect connection can also be seen in FIG. 15, but to make that connection, the proximity threshold had to be increased, i.e. weak connections in the network had to be accepted. In contrast, the use of crossover profiles establishes a strong affinity between the Verspoor profile 164 and the 1287621 profile 152 because of their strong affinities in specific areas of interest to the person whose interests are represented by the crossover profile.

Figure 18:
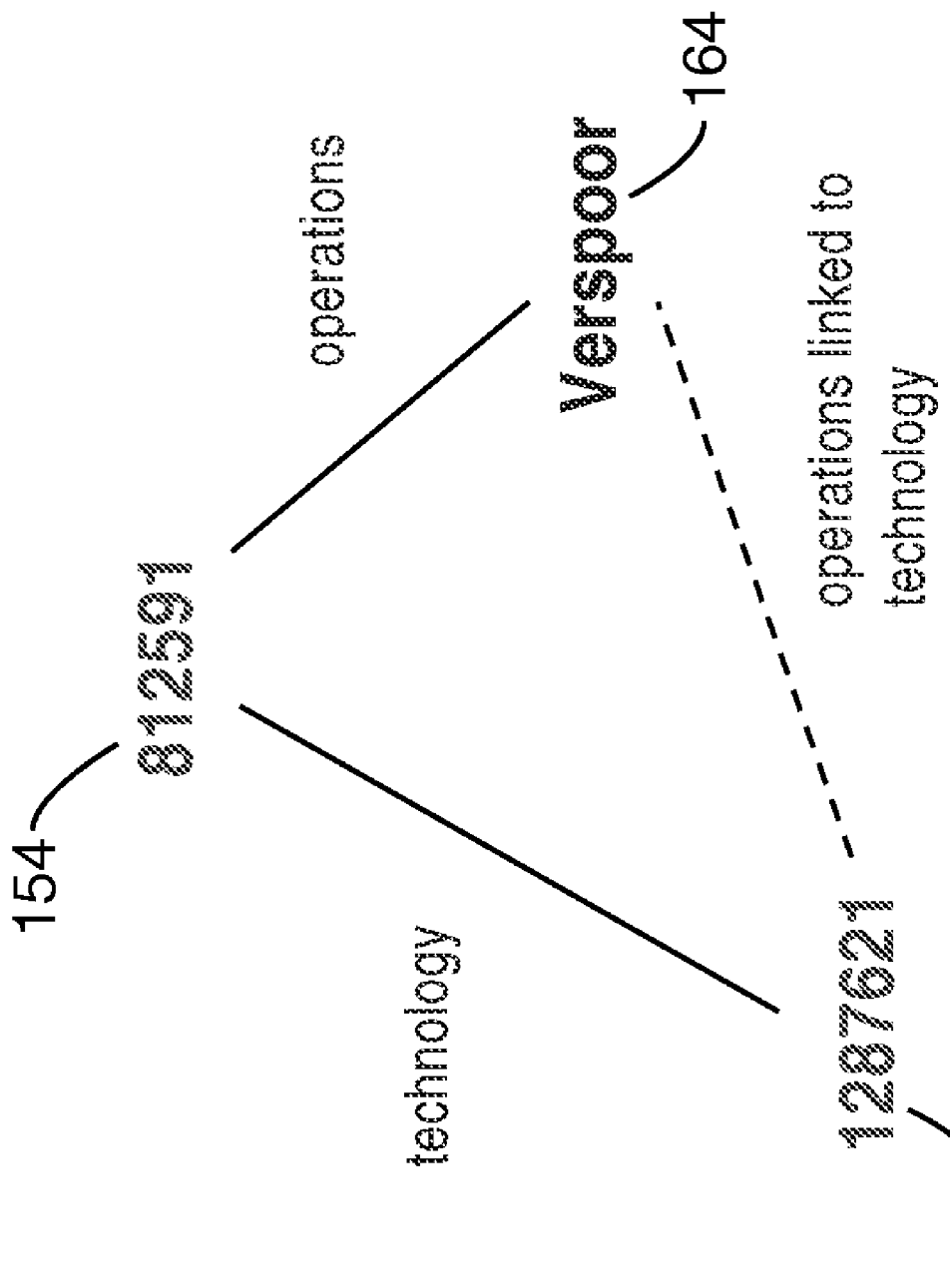
FIG. 18 illustrates the combination of proximity links to a crossover profile in two otherwise disjoint areas.

Situations in which this method would prove very useful are common. FIG. 18 illustrates a hypothetical example, showing the result of combining proximity links to the crossover profile 154 in two otherwise disjoint areas allows users from different knowledge areas to find one another through an intermediary link. The profile of Verspoor 164 might be typical of someone whose main focus is military operations. The 1287621 profile 152 could be representing a technology provider. The crossover profile might easily come from an R&D program leader whose primary role is to think about what sorts of technologies might be needed to support various types of operations.

The hierarchical nature of the knowledge model of the present invention, which directly enables subsumption matching, beneficially supports this kind of analysis. The program leader, a likely provider of crossover profiles, is apt to think in more general terms than those whose roles are more closely focused on operational needs or on a specific technology. Nevertheless, because the hierarchical model permits matching on both general and specific concepts, the kind of connections shown in FIG. 9 are readily made.

In summary, the present invention of lightweight knowledge models represented as hierarchies of key terms. Subsumption is used to implicate concept pathways (i.e. by following specific to general concepts and part to whole concepts) based on the key term hierarchy. Concept pathways may be combined into knowledge profiles representing the interest areas of specific users and viewing these as subgraphs in the larger knowledge model. The profiles of several users to may be combined to define a "knowledge zone," or overall hierarchy. Using the set of terms within a knowledge zone, and distance measures, interests of users whose profiles occupy the same knowledge zone may be matched. Finally, "crossover profiles" of users whose interests extend over several knowledge domains or topic areas may be generated in order to indirectly link users whose profiles would otherwise appear disjoint or weakly connected.

Development of system 40 may be initiated as a relatively small group of system developers and organizational facilitators offering certain core services and activities and sponsored by one or two patrons. From there it could grow to an inter-organizational consortium of members and sponsors through interpersonal, networked interactions arising from shared interests.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

TABLE 1

Key Terms
KEY TERMS

ACQUISITION
EMISSION
FISSILE MATERIAL
INTERROGATION
MATERIAL
MUONS
NUCLEAR
NUCLEAR DETECTION
NUCLEAR WEAPON
OUTPUT RADIATION
PASSIVE
TECHNOLOGY
THREAT
U-235

TABLE 2

Example Term Matrix

| | ACQUISITION | EMISSION | INTERROGATION | MUONS | NUCLEAR |
|---|---|---|---|---|---|
| $P_1$ | 2 | 2 | 0 | 1 | 0 |
| $P_2$ | 3 | 2 | 1 | 1 | 1 |

What is claimed is:

1. A system for matching a first user with a second user within a network of users, comprising:
    a database having at least one ontology;

said ontology comprising a plurality of concepts arranged within a hierarchical knowledge profile;
wherein the knowledge profile comprises a first upper-level tier and a second lower-level tier;
wherein a user's interest in a concept located within the second lower-level tier subsumes interest in a broader concept in the first upper-level tier; and
an interface allowing the first and second user to select an interest in one or more concepts;
a processor configured to match the first user and the second user as a function of their association with concepts within the knowledge profile;
wherein the interface is configured to generate a first individual knowledge profile for the first user based on concepts associated with the first user and a second individual knowledge profile for the second user based on concepts associated with the second user;
wherein the processor is configured to match the first user with the second user by calculating the distance between a selected concept located in both the first and second individual knowledge profiles;
wherein the interface comprises a graphical user interface that allows the users to graphically view the hierarchical knowledge profile; and
wherein the graphical user interface is configured such that the hierarchical knowledge profile can be viewed as: a collection of pathways, a set of sub-graphs, and a collection of key terms.

2. A system as recited in claim 1, wherein the first user may select an interest in one or more concepts to generate the first individual knowledge profile.

3. A system as recited in claim 1, wherein the processor is configured to combine the first and second individual knowledge profiles to generate the hierarchical knowledge profile.

4. A system as recited in claim 1, wherein the first and second individual knowledge profiles comprise pathways connecting concepts on the first tier and second tier;
wherein the number of times a key term appears in a pathway form matrix vectors; and
wherein the processor is configured to calculate the distance between the selected concept by computing the distance between matrix vectors.

5. A system as recited in claim 1, wherein the interfaces allows formation of a network of users by selection of a threshold distance between users.

6. A system as recited in claim 1:
wherein the processor is configured to generate a crossover profile indirectly linking a third user to the first user; and
wherein the first and third user's interests extend over a plurality of hierarchical knowledge profiles.

7. A system as recited in claim 1:
wherein the first user comprises a knowledge provider having an interest or knowledge in a desired concept; and
wherein the second user comprises a knowledge consumer having a need for said desired concept.

8. A system as recited in claim 1:
wherein the first user comprises a knowledge broker having an association with a desired concept; and
wherein the second user comprises a knowledge consumer having a need for said desired concept.

9. A system as recited in claim 1, wherein the first and second individual knowledge profiles are combined to generate the hierarchical knowledge profile.

10. A system as recited in claim 1, wherein the first and second users are selected from the group consisting of: a knowledge provider, a knowledge consumer, and a knowledge broker.

\* \* \* \* \*